E. SIMKISS.
EGG OPENER.
APPLICATION FILED AUG. 21, 1920.

1,372,564. Patented Mar. 22, 1921.

Inventor
Edwin Simkiss
By William C. Sinter
Attorney

UNITED STATES PATENT OFFICE.

EDWIN SIMKISS, OF MONTREAL, QUEBEC, CANADA, ASSIGNOR OF ONE-HALF TO JOSEPH P. WILLIAM THUOT, OF VERDUN, QUEBEC, CANADA.

EGG-OPENER.

1,372,564.     Specification of Letters Patent.     Patented Mar. 22, 1921.

Application filed August 21, 1920. Serial No. 405,160.

*To all whom it may concern:*

Be it known that I, EDWIN SIMKISS, a subject of the King of Great Britain, residing at Montreal, Province of Quebec, Canada, have invented certain new and useful Improvements in Egg-Openers; and I do hereby declare that the following is a full, clear, and exact description of the invention, such as will enable others skilled in the art to which it appertains to make and use the same.

The present invention relates to new and useful improvements in egg openers.

The primary object of the invention is the provision of a device of this character by means of which the upper end or peak of an egg can be easily removed without danger of dropping particles of shell therein.

Another object of the invention is the provision of an egg opener including a pair of movable handles, with means upon one handle for gripping and receiving the egg, and means upon the other handle for severing that portion of the egg shell which extends above the gripping device.

A further object of the invention is the provision of an egg opener which will be comparatively simple and inexpensive to manufacture, reliable and efficient in use, and readily operated.

With the above and other objects in view, the present invention resides in the novel features of construction, formations, combinations and arrangements of parts to be hereinafter more fully described, claimed, and illustrated in the accompanying drawing, forming a part of the present invention, and in which:

Figure 1:
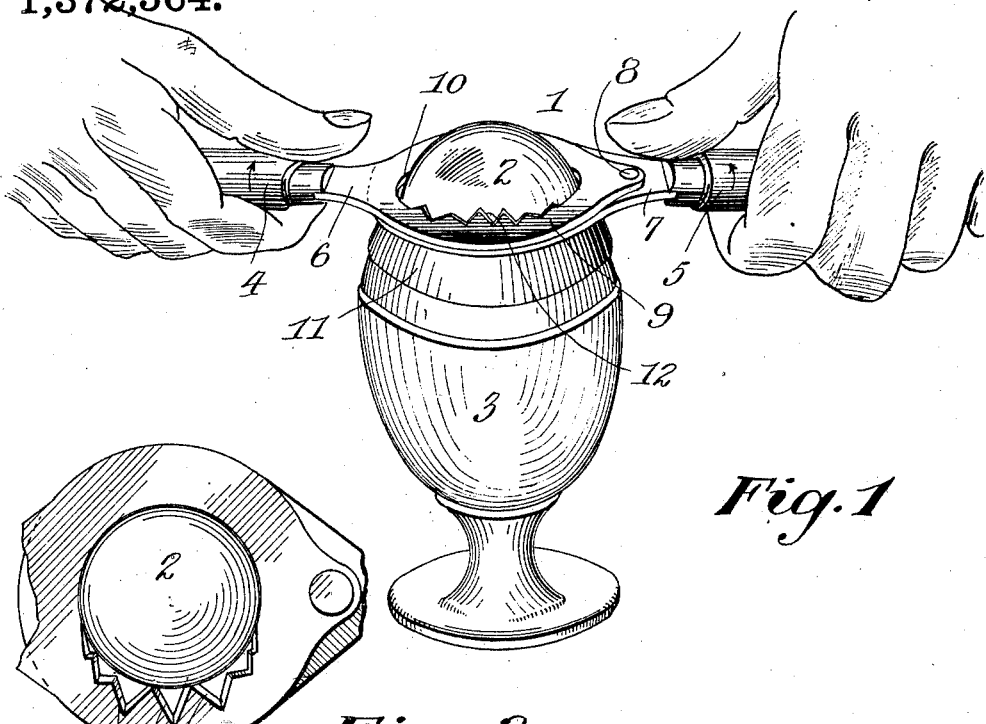
Figure 1 is a perspective view showing application of the opener to an egg.
Figure 3:
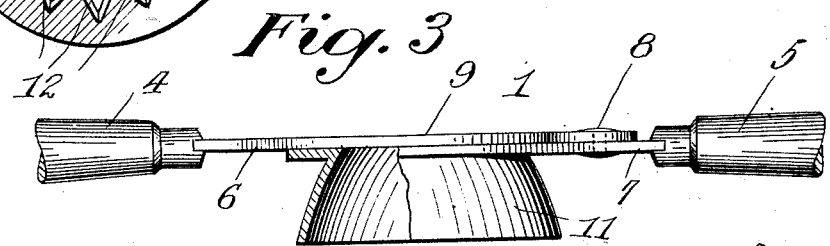
Fig. 3 is a top plan view showing the egg in position prior to having its end severed; and, Fig. 4 is a similar view showing the end of the egg removed.
Figures 2, 4:
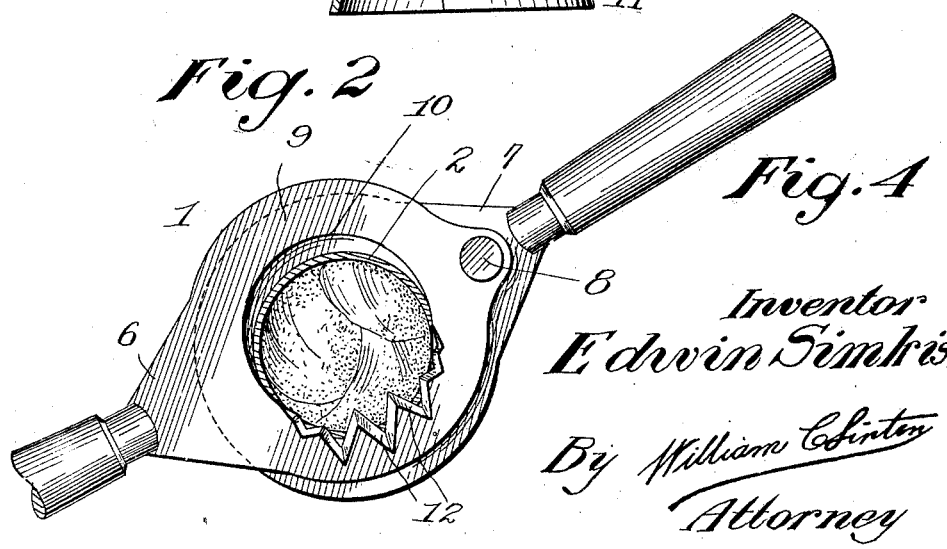
Fig. 2 is a side view thereof.

Referring now to the accompanying drawing by corresponding characters of reference throughout the several views, the numeral 1 designates in general my improved egg opener shown for the purposes of illustration used in connection with the opening of an egg 2, which rests within an egg cup 3. The opener 1 consists of a pair of handles 4 and 5 to which are attached a pair of flat strips of material 6 and 7 pivoted adjacent one of the handles at 8, so that upon the operation of the handle in opposite directions these strips of material 6 and 7 will be slid across each other. These strips 6 and 7 include circular body portions 9 provided with central openings 10 of a size to permit the passage of an egg therethrough. These openings 10 are also disposed in alinement, as is clearly shown in the drawing.

A gripping device 11 is secured to the underside of the strip 7, and is of a shape to receive the upper end of an egg 2 which passes through both of said openings 10, as clearly shown in Fig. 1 of the drawing.

The inner side of the strip 6 is provided with a plurality of sharpened teeth 12 which are adapted to crush the shell of the egg and sever the upper end thereof.

In operation, the egg 2 is placed in the cup 3, as shown in Fig. 1, and the opener 1 in engagement with the egg, as is also shown in Fig. 1, the said egg fitting within the gripping device 11, as clearly shown in the drawing. The handles are then drawn toward the operator in the direction of the arrows in Fig. 1, and the upper end of the egg will be severed in such manner that the danger of particles of shell from falling into the egg will be eliminated.

From the foregoing description taken in connection with the accompanying drawing, it will be manifest that an egg opener is provided which will fulfil all of the necessary requirements of such a device.

It should be understood in this connection, that various minor changes in the specific details of construction can be resorted to within the scope of the appended claim, without departing from the spirit or sacrificing any of the advantages of the invention.

Having thus fully described the invention, what I claim as new and desire to protect by Letters Patent is:

In an egg opener, a pair of strips of material pivoted together so that they will pass one across the other, handles at the outer sides of said strips for operating the same, said strips having openings therein of a size to receive the end of the egg, an egg gripping device secured to one strip and communicating with the opening therein, and teeth provided upon the other strip and being directed toward the center of the opening and having their outer surfaces beveled to form knife edges at their inner surfaces, substantially as and for the purposes set forth.

In witness whereof I have hereunto set my hand.

EDWIN SIMKISS.